United States Patent
Matsumoto et al.

(10) Patent No.: US 7,240,411 B2
(45) Date of Patent: Jul. 10, 2007

(54) MACHINE TOOL (75) Inventors: Kazuhiko Matsumoto, Yamatokoriyama (JP); Takeshi Otawa, Yamatokoriyama (JP)

(73) Assignee: Mori Seiki Co., Ltd., Yamatokoriyama-shi (JP)

( * ) Notice: Subject to any disclaimer, the term of this patent is extended or adjusted under 35 U.S.C. 154(b) by 0 days.

(21) Appl. No.: 11/389,507

(22) Filed: Mar. 27, 2006

(65) Prior Publication Data

US 2006/0225261 A1    Oct. 12, 2006

(30) Foreign Application Priority Data

Apr. 6, 2005  (JP) .............................. 2005-109438

(51) Int. Cl.
    *B23P 23/02*    (2006.01)
(52) U.S. Cl. .................... 29/27 C; 82/117; 82/121; 82/129; 82/137; 82/149; 409/202; 409/165
(58) Field of Classification Search ............. 29/27 C, 29/27 R; 82/129, 117, 120, 121, 131, 132, 82/137, 138, 149, 157, 159; 409/165, 202, 409/212, 235
    See application file for complete search history.

(56) References Cited

U.S. PATENT DOCUMENTS

| | | | |
|---|---|---|---|
| 5,439,431 A * | 8/1995 | Hessbruggen et al. ...... 29/27 C |
| 5,662,568 A * | 9/1997 | Lindem ...................... 409/235 |
| 5,933,933 A * | 8/1999 | Fritz et al. .................. 29/33 P |
| 6,012,884 A * | 1/2000 | Azema ........................ 409/235 |
| 6,264,590 B1 * | 7/2001 | Ferrari ....................... 409/137 |
| 6,439,813 B1 * | 8/2002 | Repossini ................... 409/235 |
| 6,551,038 B1 * | 4/2003 | Sugata et al. ............... 409/235 |
| 7,043,805 B2 * | 5/2006 | Tokuma et al. ............. 29/27 C |
| 2005/0022351 A1 * | 2/2005 | Tokuma et al. ............. 29/27 C |

FOREIGN PATENT DOCUMENTS

JP    2000-24853 A    1/2000

* cited by examiner

*Primary Examiner*—Dana Ross
(74) *Attorney, Agent, or Firm*—Smith Patent Office (57) ABSTRACT

To provide a machine tool in which positioning accuracy of a ram is ensured, realizing improved machining accuracy. A cylindrical ram 14 supporting a spindle 6 is inserted in a ram guide hole 13*a* formed in a cross slide 13, the ram 14 has supported surfaces 14*d*, 14*d* in a V-shape formed on a lower side of an outer circumferential surface thereof, and the supported surfaces 14*d* are placed on supporting surfaces 22*a*, 22*a* in a V-shape formed on an inner circumferential surface of the ram guide hole 13*a* of the cross slide 13, so that a Z-axis direction position of the ram 14 is automatically aligned.

8 Claims, 8 Drawing Sheets

FRONT SIDE OF MACHINE

MACHINE TOOL

BACKGROUND OF THE INVENTION

1. Field of the Invention

The present invention relates to a machine tool including a spindle supporting mechanism movably supporting a spindle disposed on a bed, and more particularly, to improvement in a supporting structure of a ram supporting the spindle.

2. Description of the Related Art

An example of a machine tool of this type is structured such that a saddle is supported by a column disposed on a bed to be movable in an up/down direction, and a ram (spindle head) is supported by the saddle to be movable in a front/back direction. In this machine tool, the ram is movably supported by a pair of left and right guide rails disposed on a flat surface extending in the front/back direction of the saddle (see, for example Patent document 1).

[Patent document 1] Japanese Patent Application Laid-open No. 2000-24853

Incidentally, if the structure in which the ram is supported by the left and right guide rails disposed on the flat surface as in the above-described conventional machine is adopted, it may possibly become difficult to ensure positioning accuracy of the ram in a left/right direction perpendicular to the left and right guide rails, which gives rise to a concern about the influence to machining accuracy.

SUMMARY OF THE INVENTION

The present invention was made in consideration of the conventional circumstances described above and it is an object thereof to provide a machine tool in which positioning accuracy of a ram in a left/right direction is easily ensured and thus machining accuracy can be improved.

In an invention, a machine tool includes a spindle supporting mechanism by which a spindle disposed on a bed is supported to be movable in X-axis, Y-axis, and Z-axis directions, wherein the spindle supporting mechanism includes: a cross slide supported via a saddle by a column disposed on the bed to be movable in the Z-axis (left/right) and X-axis (up/down) directions; and a cylindrical ram supported by the cross slide to be movable in the Y-axis direction and supporting the spindle, and wherein the ram is slidably inserted in a ram guide hole formed in the cross slide and has a supported surface formed on a lower side of an outer circumferential surface thereof, the cross slide has a supporting surface which is formed on a lower side of an inner circumferential surface of the ram guide hole and by which the supported surface is supported to be slidable in the Y axis direction, and the supporting surface and the supported surface automatically align a Z-axis direction position of the ram.

In the invention, the supported surface formed on the lower side of the outer circumferential surface of the ram is supported by the supporting surface formed on the lower side of the inner circumferential surface of the ram guide hole of the cross slide, so that the Z-axis direction position of the ram is automatically aligned owing to an alignment function by the supporting surface and the supported surface. As a result, accuracy of the Z-axis-direction position of the ram is improved, which accordingly can enhance machining accuracy.

In a preferable embodiment of the invention, the ram has a pressed surface formed on an upper side of the outer circumferential surface, and the ram guide hole of the cross slide has a pressing surface formed on an upper side of the inner circumferential surface and slidably pressing the pressed surface.

In the above-described embodiment, since the pressed surface on the upper side of the outer circumferential surface of the ram is pressed by the pressing surface formed on the upper side of the inner circumferential surface of the ram guide hole of the cross slide, accuracy of the Z-axis direction position and accuracy of the Y-axis direction position of the ram can be improved, which can further enhance machining accuracy.

In another preferable embodiment of the invention, the outer circumferential surface of the ram is in a polygonal shape, in which two lower sides constitute the supported surface in a V-shape and two upper sides among the other sides constitute the pressed surface in a V-shape, and the supporting surface and the pressing surface in a V-shape are formed on the lower side and the upper side of the inner circumferential surface of the ram guide hole of the cross slide respectively.

In the above-described embodiment, the two lower sides of the polygonal ram constitute the V-shaped supported surface and the two upper sides among the other sides constitute the V-shaped pressed surface, and the V-shaped supporting surface and pressing surface corresponding to the supported surface and the pressed surface are formed in the cross slide, which makes it possible to realize the automatic alignment of the ram with a simple structure.

In still another preferable embodiment of the invention, the cross slide is composed of a flat part supported by the saddle and a cylindrical ram supporting part having the ram guide hole, the flat part and the ram supporting being integrally formed, and a slide plate constituting the supporting surface and a pressing plate constituting the pressing surface are provided on the inner circumferential surface of the ram guide hole.

In the above-described embodiment, in the cross slide, the flat part and the cylindrical ram supporting part having the ram guide hole are integrally formed, so that it is possible to reduce cost and enhance dimension accuracy, compared with a case where the cross slide is dividedly formed.

Further, the slide plate constituting the supporting surface and the pressing plate constituting the pressing surface are disposed in the ram guide hole of the cross slide, which can facilitate position adjustment or the like when the ram is attached.

In still another preferable embodiment of the invention, the slide plate is composed of parallel plates whose thickness is fixed in the Y-axis direction, and the pressing plate is composed of a base plate and a liner plate each having an inclination in the Y-axis direction.

In the above-described embodiment, the slide plate is composed of the parallel plates whose thickness in the Y-axis direction is fixed, and the pressing plate is composed of the base plate and the liner plate each having the inclination. Therefore, by adjusting a pressing force by the base plate and the liner plate using the slide plate as a reference plane, it is possible to easily assemble the ram with high accuracy.

In still another preferable embodiment of the invention, the slide plate is integrally formed on the inner circumferential surface of the ram guide hole of the ram supporting part.

In the above-described embodiment, since the slide plate is integrally formed on the inner circumferential surface of the ram supporting part, it is possible to reduce the number of parts and cost.

In still another preferable embodiment of the invention, the slide plate and the pressing plate are disposed in each of axial-direction both end portions of the ram supporting part, and a gravity center of the ram is constantly positioned between the both end portions of the ram supporting part in a whole stroke of the ram.

In the above-described embodiment, the slide plate and the pressing plate are disposed in each of the axis-direction both end portions of the ram supporting part and the gravity center of the ram is constantly positioned between the both ends of the ram supporting part. Therefore, it is possible to prevent the gravity center from overhanging from the ram supporting part in accordance with the Y-axis direction movement of the ram, which can prevent the ram from being deformed by a machining reaction force, resulting in enhanced machining accuracy.

In still another preferable embodiment of the invention, the spindle includes a tool spindle which is attached to be directed perpendicularly to an axis of the ram, and the tool spindle is supported to be rotary indexable around the Y axis.

In the above-described embodiment, the tool spindle of the spindle is directed perpendicularly to the axis of the ram and is rotary indexable around the Y-axis, which enables complicated machining by so-called B-axis driving.

BRIEF DESCRIPTION OF THE DRAWINGS

FIG. 6(*a*) and FIG. 6(*b*) are views of the cross slide;

DETAILED DESCRIPTION OF THE PREFERRED EMBODIMENT

An embodiment of the present invention will be hereinafter described based on the attached drawings.

Figure 1:
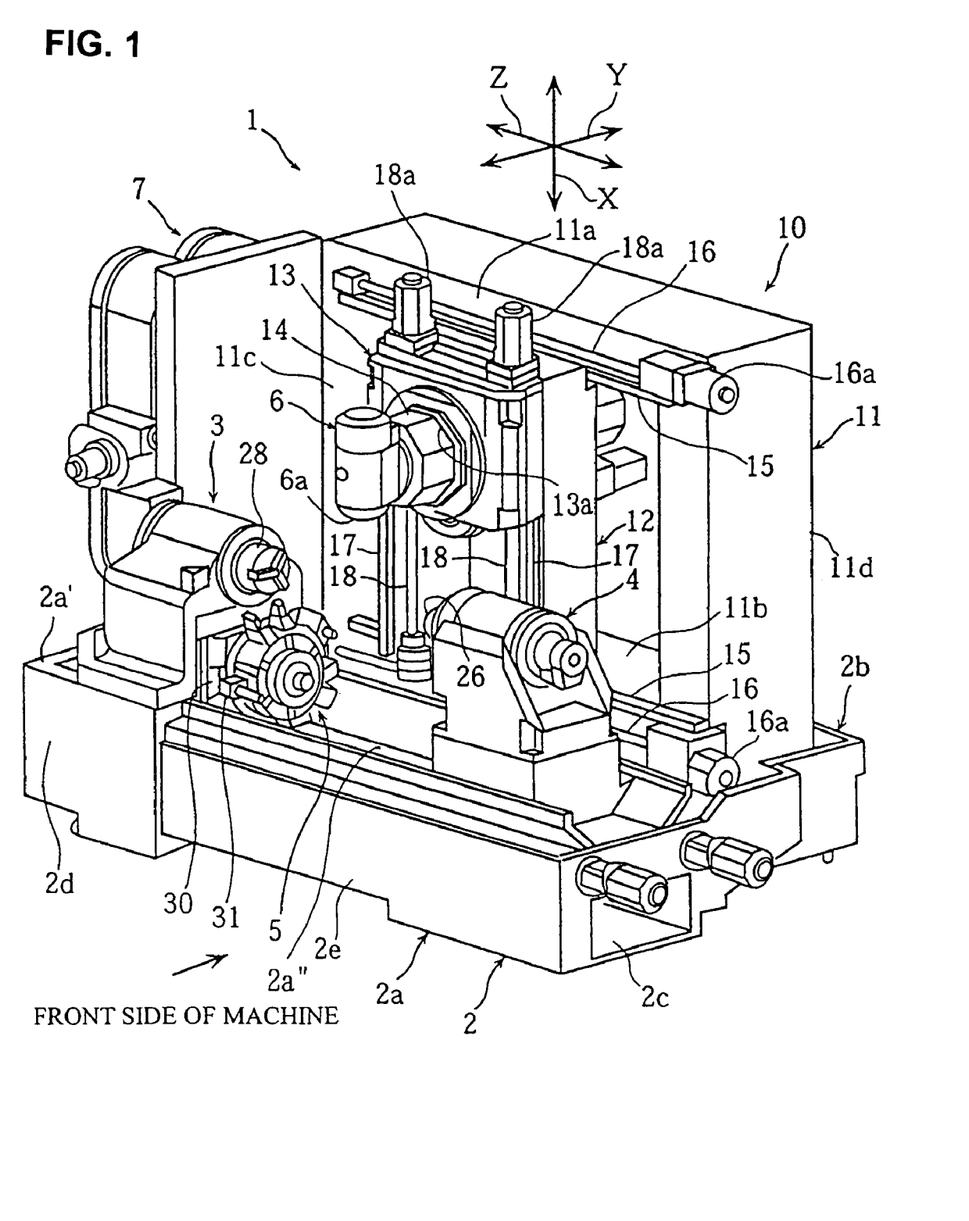
FIG. 1 is a perspective view of a composite lathe according to one embodiment of the present invention.
Figure 2:
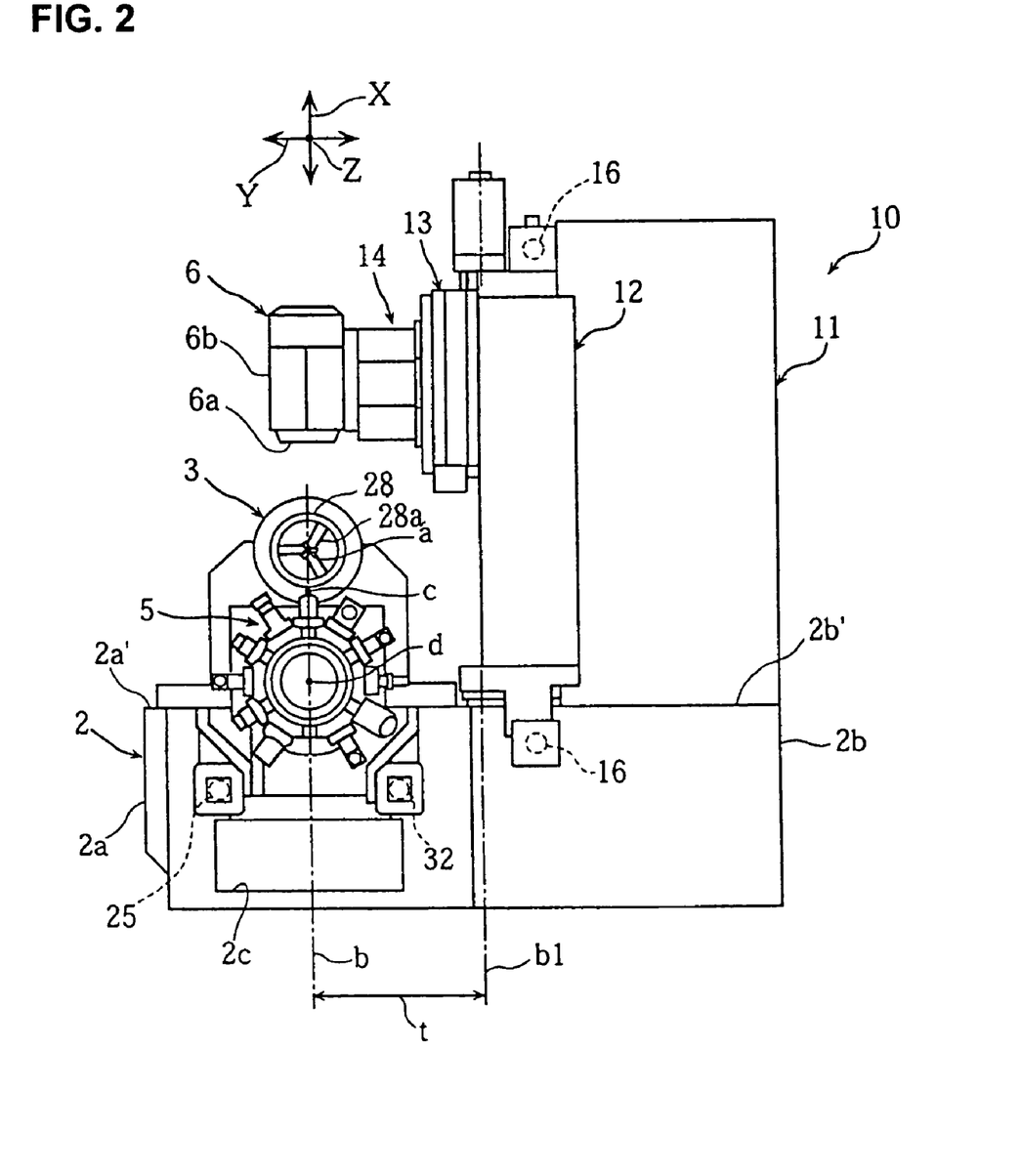
FIG. 2 is a side view of the composite lathe.
Figure 3:
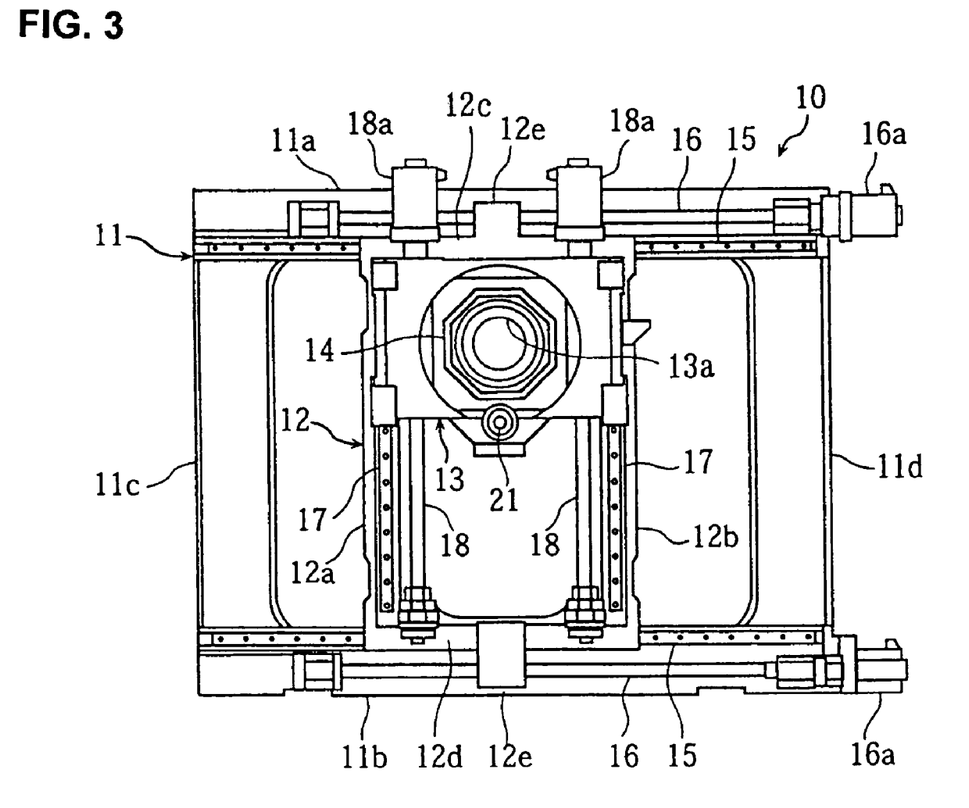
FIG. 3 is a front view of a supporting mechanism supporting a third spindle.
Figure 4:
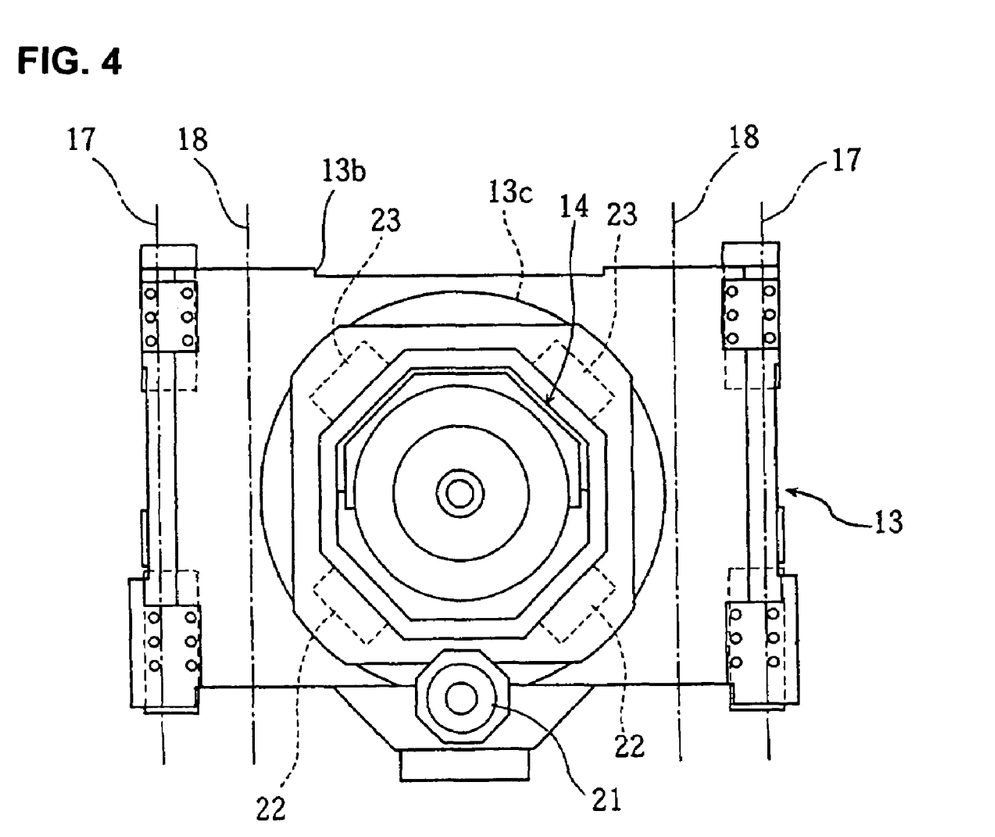
FIG. 4 is a front view of a cross slide supporting a ram.
Figure 5:
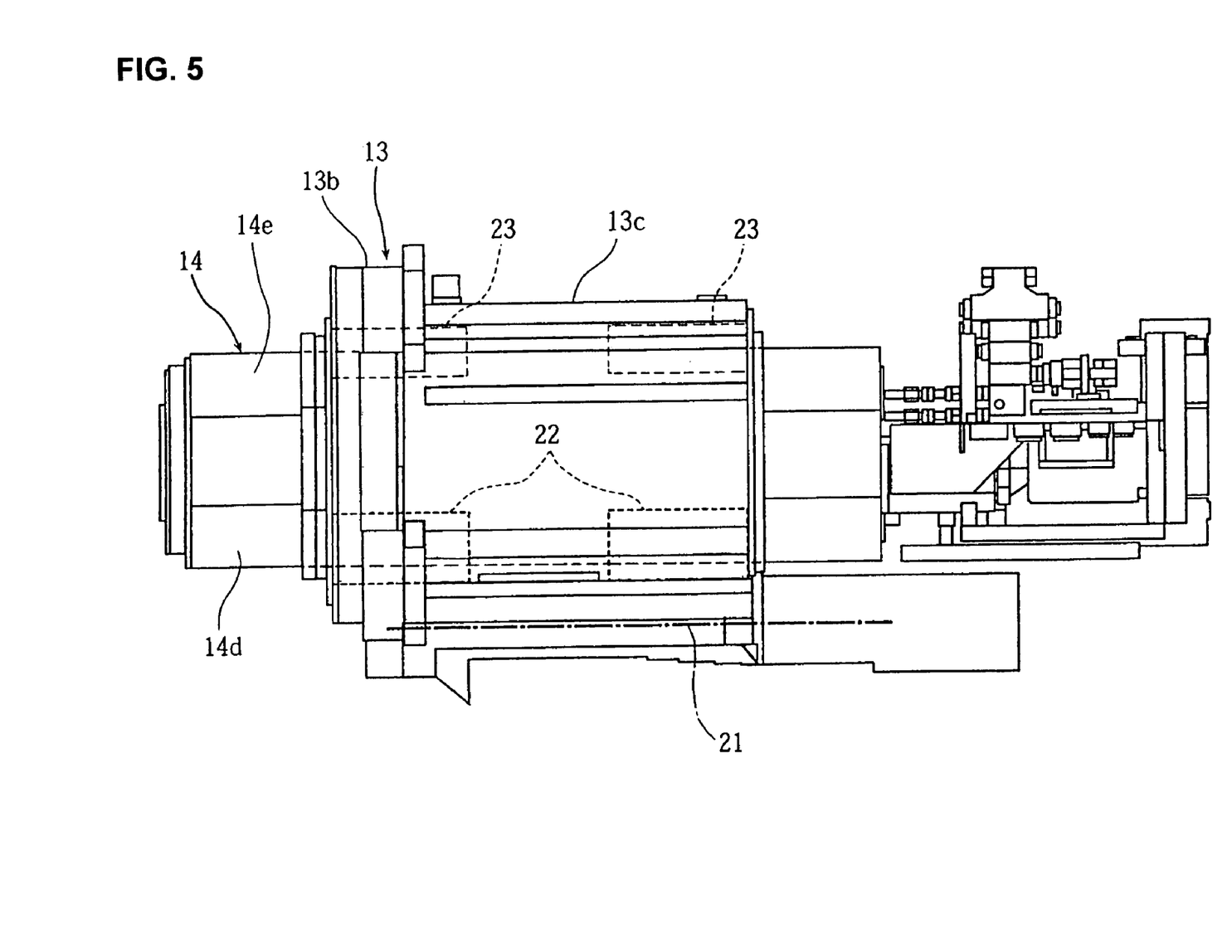
FIG. 5 is a side view of the cross slide.
Figure 6A:
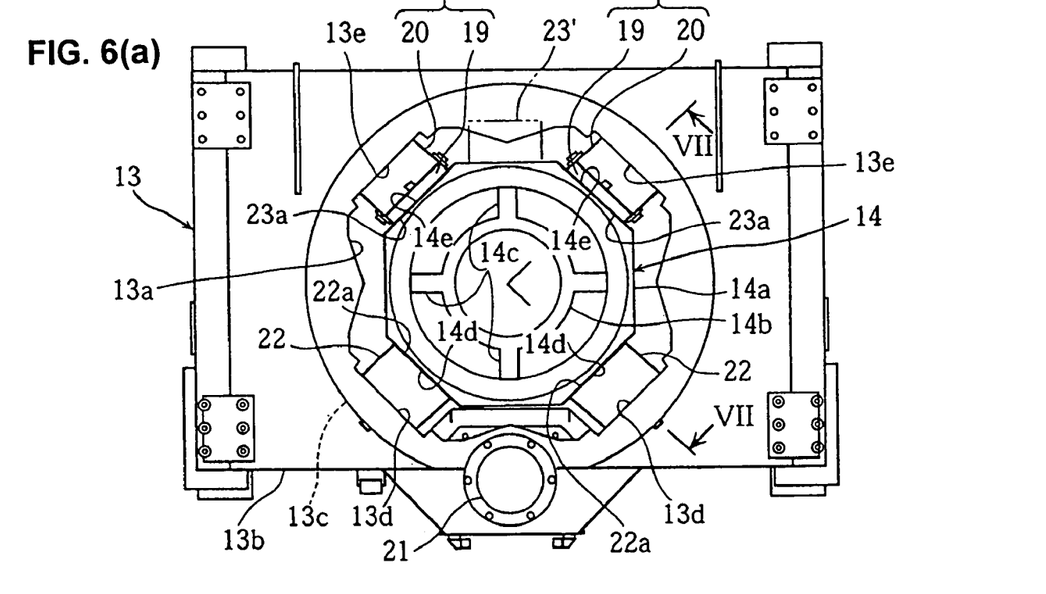
Figure 6B:
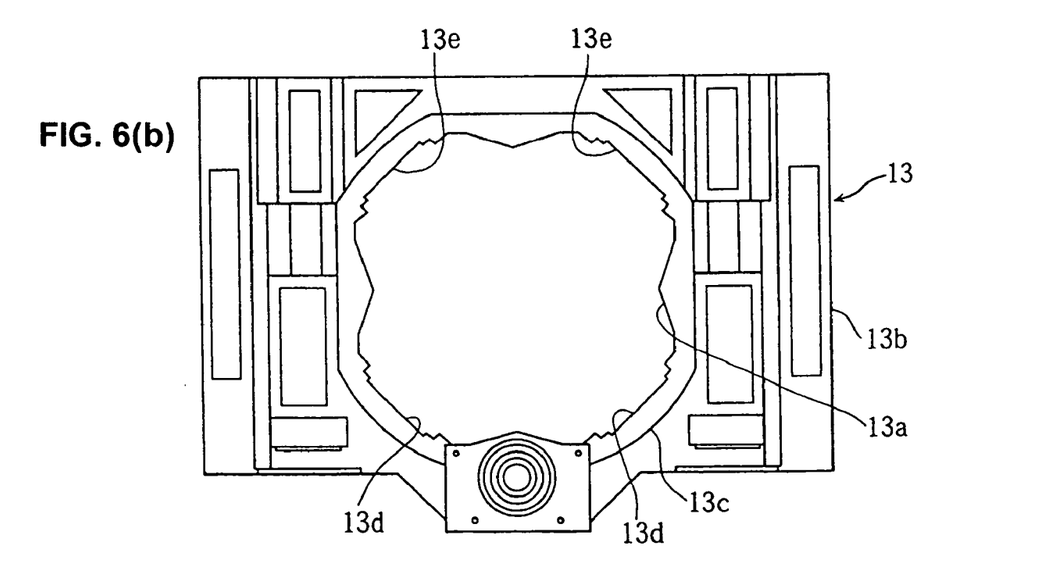
Figure 7:
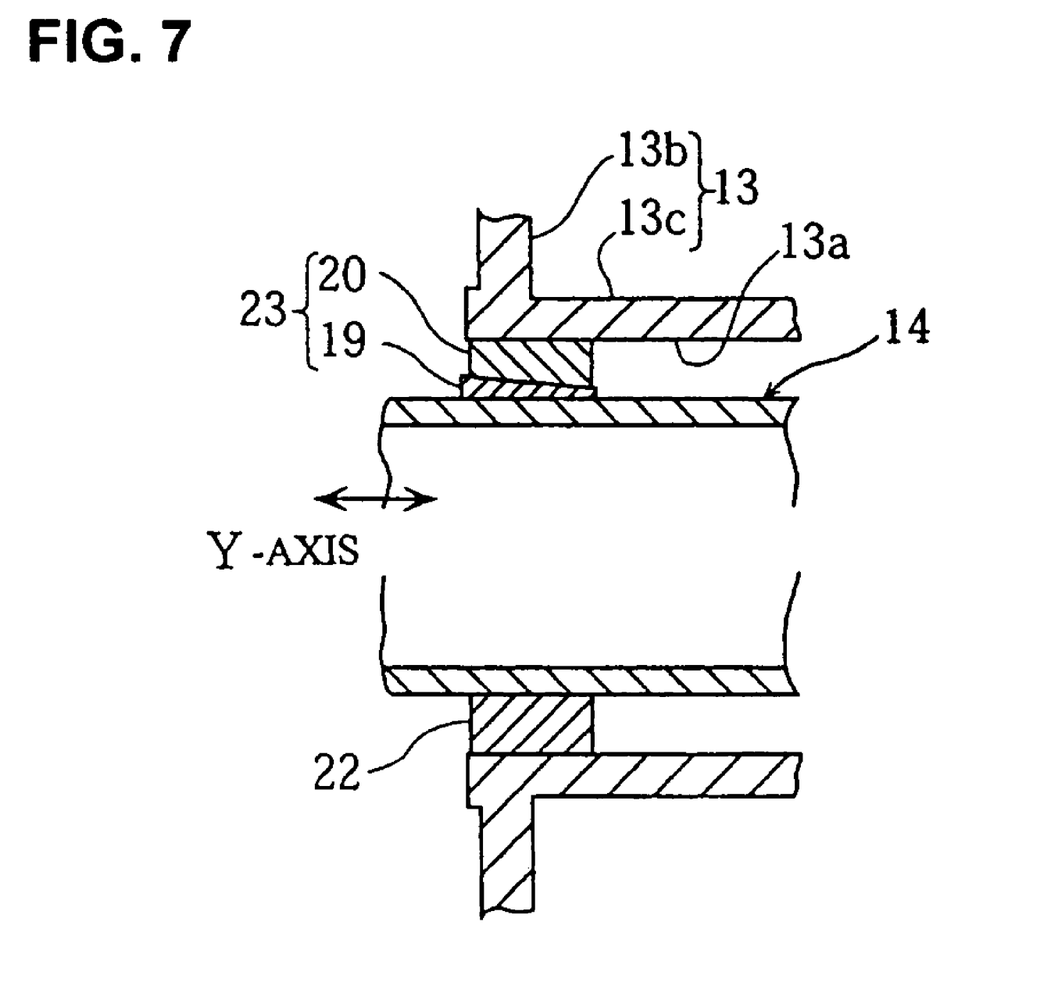
FIG. 7 is a cross-sectional view of the cross slide (a cross-sectional view taken along the VII—VII line in FIG. 6(*a*))
Figure 8:
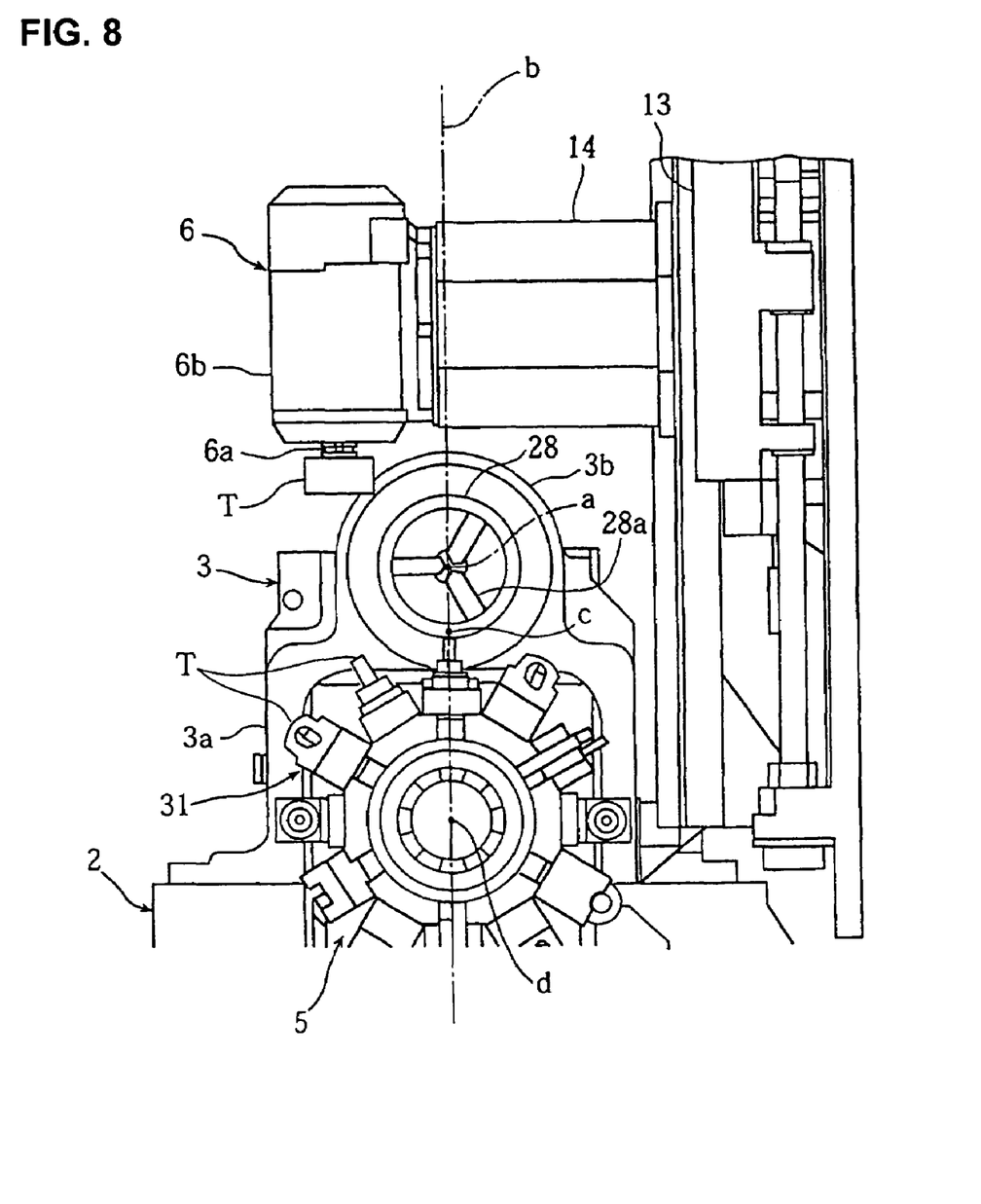
FIG. 8 is a view of the third spindle when seen in a Z-axis direction.

FIG. 1 to FIG. 8 are views to illustrate a composite lathe according to one embodiment of the present invention. FIG. 1 and FIG. 2 are a perspective view and a right side view of the composite lathe respectively, FIG. 3 is a front view of a spindle supporting mechanism supporting a third spindle, FIG. 4 and FIG. 5 are a front view and a right side view of a cross slide supporting a ram, FIG. 6(*a*) and FIG. 6(*b*) are a front view and a rear view of the cross slide, FIG. 7 is a cross-sectional view taken along the VII—VII line in FIG. 6(*a*), and FIG. 8 is a view of the third spindle when seen in a Z-axis direction. Note that front/back and left/right mentioned in this embodiment mean front/back and left/right when the machine is seen from a front side, unless otherwise noted.

In the drawings, 1 denotes the composite lathe. When seen from the front side of the machine shown in FIG. 1, the composite lathe 1 includes: a bed 2; a first spindle headstock 3 disposed on the bed 2; a second spindle headstock 4 coaxial with the first spindle headstock 3 and movable in the Z-axis (left/right) direction; a tool post 5 disposed between the first and second spindle headstocks 3, 4 to be movable in an X-axis (up/down) direction and in the Z-axis direction; and a third spindle 6 disposed on the bed 2 to be movable in the X-axis direction, a Y-axis (front/back) direction, and the Z-axis direction. On a left end portion on the bed 2, provided is a tool changer 7 automatically changing a preceding-process tool attached to the third spindle 6 to a subsequent-process tool.

The bed 2 is constituted of a front bed part 2*a* and a back bed part 2*b* which are integrally formed. A first and a second mounting surface 2*a*', 2*a*'' are formed on the front bed part 2*a* and third mounting surfaces 2*b*' are formed on the back bed part 2*b*, all these surfaces being horizontal along the Z-axis direction and the Y-axis direction.

The first spindle headstock 3 is mounted on the first mounting surface 2*a*'. On the second mounting surface 2*a*'', the second spindle headstock 4 and the tool post 5 are movably mounted. Further, on the third mounting surfaces 2*b*', a spindle supporting mechanism 10 movably supporting the third spindle 6 is mounted.

A first and a second spindle 28, 26 are rotatably inserted in the first and second spindle headstocks 3, 4 to face each other. The second spindle headstock 4 is movable to a delivery position where it can directly receive a workpiece attached to the first spindle 28 of the first spindle headstock 3. Concretely, the second spindle headstock 4 is movable in the Z-axis direction up to a position so that front faces of chucks of the first and second spindles 28, 26 abuttingly face each other.

The tool post 5 has: a turret 31 to whose outer circumferential portion a large number of tools T are attached at a predetermined interval apart from one another and which rotary-indexes and positions a desired tool T at a predetermined machining position to clamp it at the machining position; and a supporting member 30 by which the turret 31 is supported to be movable in the X-axis direction.

When the first and second spindles 28, 26 abut on each other, the tool post 5 is positioned right under the first spindle headstock 3 so that its cutting point "c" is positioned vertically under an axis "a" of the first and second spindle headstocks 3, 4. Consequently, a workpiece cutting direction of the tool of the turret 31 is in line with a vertical line "b". Concretely, when seen from a right side in the Z-axis direction, as shown in FIG. 2, the cutting point "c" and a rotation center "d" of the turret 31 are collinear on the vertical line "b" going through the axis "a" of the first and second spindle headstocks 3, 4.

The spindle supporting mechanism 10 includes: a column 11 in a rectangular frame shape which is fixed on the third mounting surfaces 2*b*' of the back bed part 2*b* to extend vertically upward; a saddle 12 in a rectangular frame shape which is supported on a front face of the column 11 to be movable in the Z-axis direction; a cross slide 13 supported on a front face of the saddle 12 to be movable in the X-axis direction; and a ram 14 supported by the cross slide 13 to be movable in the Y-axis direction and supporting the third spindle 6.

The column 11 is structured such that left and right support posts 11*c*, 11*d* and upper and lower beam parts 11*a*, 11*b*, which couple upper and lower ends of the left and right support posts 11*c*, 11*d*, are integrally molded. The column 11 is firmly fixed on the third mounting surfaces 2*b*' of the back bed part 2*b*.

Similarly to the column 11, the saddle 12 is structured such that left and right support posts 12*a*, 12*b* and upper and lower beam parts 12*c*, 12*d*, which couple upper and lower ends of the left and right support posts 12*a*, 12*b*, are integrally molded. The saddle 12 is supported to be movable in the Z-axis direction by a pair of upper and lower Z-axis guide rails 15, 15 which are disposed in parallel to the Z-axis on front faces of the upper and lower beam parts 11a, 11b of the column 11. Z-axis ball screws 16, 16 are screwed to nut parts 12e, 12e formed in the upper and lower beam parts 12c, 12d of the saddle 12. The saddle 12 is driven to reciprocate in the Z-axis direction when the Z-axis ball screws 16, 16 are coaxially driven by servo motors 16a, 16a. Note that the Z-axis ball screws 16, 16 are disposed in parallel to the Z axis on the front faces of the upper and lower beam parts 11a, 11b of the column 11.

The cross slide 13 is supported to be movable in the X-axis direction by a pair of left and right X-axis guide rails 17, 17 which are disposed in parallel to the X axis on the front faces of the left and right support posts 12a, 12b of the saddle 12. X-axis ball screws 18, 18 are screwed to nut parts formed on left and right sides of the cross slide 13. The cross slide 13 is driven to reciprocate in the X-axis direction when the X-axis ball screws 18, 18 are rotary driven by servo motors 18a, 18a. Note that the X-axis ball screws 18, 18 are disposed in parallel to the X axis on the front faces of the left and right support posts 12a, 12b of the saddle 12.

The third spindle 6 is rotatably inserted in the ram 14. At a tip of the third spindle 6, a tool spindle 6a is disposed, with its axis directed perpendicularly to the Y axis. A tool is attached to a tip of the tool spindle 6a and the tool spindle 6a is rotary driven by a driving motor 6b. Further, the third spindle 6 can be rotary indexed around the Y axis for positioning by a built-in rotary indexing mechanism (not shown), so that so-called B-axis machining is performed.

Here, an XY supporting plane parallel to the X axis and the Y axis by which the turret 31 of the tool post 5 is supported to be movable in the X-axis direction is orthogonal to an XZ supporting plane b1 parallel to the X axis and the Y axis by which the third spindle 6 is supported to be movable in the X-axis direction. Further, as shown in FIG. 2, an X-axis direction movement line (the aforesaid vertical line "b") of the turret 31 in the tool post 5 is arranged a predetermined distance "t" apart in the Y-axis direction from the XZ supporting plane b1 of the third spindle 6.

A cutting point of the third spindle 6 is constantly positioned in an area surrounded by the pair of upper and lower Z-axis guide rails 15, 15 and the pair of left and right X-axis guide rails 17, 17. Further, a lower end of an X-axis stroke of the third spindle 6 is set to substantially coincide with the cutting point "c" of the tool post 5 for a workpiece with the maximum diameter when seen in the Z-axis direction.

The cross slide 13 is structured such that a flat part 13b in a rectangular thick plate shape formed to cover the front face of the saddle 12 and a cylindrical ram supporting part 13c extending toward the saddle 12 from a rear face of the flat part 13b are integrally formed by molding.

The aforesaid X-axis guide rails 17, 17 are disposed on left and right end portions of the rear face of the flat part 13b, and the aforesaid X-axis ball screws 18, 18 are disposed on an inner side of the X-axis guide rails 17, 17.

The ram guide hole 13a is formed to pass through the flat part 13b and the ram supporting part 13c in the Y-axis direction. Further, the ram 14 has a length large enough to constantly protrude outward from front and back openings of the ram guide hole 13a while moving along the whole length of the Y-axis stroke.

The ram 14 is composed of: an outer cylinder part 14a having an octagonal outer circumferential surface; an inner cylinder part 14b in a cylindrical shape disposed in a center portion of the outer cylinder part 14a; and a plurality of coupling parts 14c coupling the inner cylinder part 14b and the outer cylinder part 14b, all these components being integrally formed.

Two lower sides of the outer circumferential surface of the ram 14 constitute supported surfaces 14d, 14d in a V-shape extending along the whole length of the ram 14, when seen from the front side. Further, two upper sides thereof constitute pressed surfaces 14e, 14e in an inverse V-shape extending along the whole length of the ram 14. A contained angle of the supported surfaces 14d, 14d and a contained angle of the pressed surfaces 14e, 14e are set to 45 degrees.

Further, an inner circumferential surface of the ram guide hole 13a of the cross slide 13 has lower-side plate mounting seats 13d, 13d in a V-shape and upper-side plate mounting seats 13e, 13e in an inverse V-shape corresponding to the supported surfaces 14d, 14d and the pressed surfaces 14e, 14e of the ram 14.

The lower-side plate mounting seats 13d, 13d and the upper-side plate mounting seats 13e, 13e are formed by machining work, and are machined to make the same angles as the angles made by the supported surfaces 14d, 14d and the pressed surfaces 14e, 14e respectively.

Slide plates 22, 22 constituting the respective supporting surfaces 22a, 22a are fixedly disposed on the upper-side plate mounting seats 13d, 13d. Further, pressing plates 23, 23 constituting the respective pressing surfaces 23a, 23a are fixedly disposed on the upper-side plate mounting seats 13e, 13e.

The slide plates 22, 22 and the pressing plates 23, 23 are disposed in each of axial-direction both end portions of the cross slide 13, and lengths and strokes of the ram 14 and the cross slide 13 are set so that a gravity center of the ram 14 is constantly positioned between the both end portions in the whole length of the Y-axis stroke.

Each of the slide plates 22 is composed of parallel plates whose thickness in the Y-axis direction is fixed, and they serve as reference planes for mounting the ram 14. Each of the pressing plates 23 is composed of a base plate 19 and a liner plate 20 each having a predetermined inclination. By adjusting positions in a ram axis direction of the base plates 19 and the liner plates 20, it is possible to press the ram 14 against the left and right slide plates 22 with a predetermined pressing force.

Each of the slide plates 22 and the pressing plates 23 is formed in a shape of a block whose plate thickness is large in a radial direction. Incidentally, the slide plates 22 are formed as separate structures, but in the present invention, the slide plates may be formed integrally on the inner circumferential surface of the ram supporting part. In this case, the number of parts and cost can be reduced.

The supported surfaces 14d of the ram 14 are slidably mounted on the respective supporting surfaces 22a of the slide plates 22 of the cross slide 13, and the Z-axis direction position of the ram 14 is automatically aligned owing to its self weight. The pressed surfaces 14e of the ram 14 are slidably pressed by the respective pressing surfaces 23a of the pressing plates 23 of the cross slide 13.

In the composite lathe 1 of this embodiment, while the workpiece is rotated by the first spindle 28 of the first spindle headstock 3 or the second spindle 26 of the second spindle headstock 4, the tool post 5 cuts in the workpiece to perform cutting work and the third spindle 6 performs machining such as grinding and boring.

According to this embodiment, the supported surfaces 14d, 14d in the V-shape are formed on the lower side of the outer circumferential surface of the ram 14, and the supported surfaces 14d, 14d are supported by the supporting surfaces 22a, 22a in the V-shape formed in the lower side of the inner circumferential surface of the ram guide hole 13a of the cross slide 13. Consequently, the Z-axis direction position of the ram 14 is automatically aligned by its own weight, so that positioning accuracy in the Z-axis direction of the ram 14 is improved and the weight of the ram 14 is always given uniformly to the both supporting surfaces 22a, 22a of the cross slide 13. As a result, machining accuracy can be improved.

Moreover, the pressed surfaces 14e, 14e on the upper side of the outer circumferential surface of the ram 14 are pressed by the pressing surfaces 23a, 23a formed on the upper side of the inner circumferential surface of the ram guide hole 13a of the cross slide 13. Consequently, positioning accuracy of the ram 14 in the Y-axis direction can be also improved, which can enhance machining accuracy.

In this embodiment, the ram 14 is octagonal, with the two lower sides of the ram 14 constituting the supported surfaces 14d, 14d in the V-shape and the two upper sides of the ram 14 constituting the pressed surfaces 14e, 14e in the V-shape. Therefore, it is possible to realize automatic alignment of the ram 14 with a simple structure.

Incidentally, in this embodiment, an outer shape of the ram 14 is octagonal, but the ram of the present invention is not limited to be octagonal, but may be quadrangular, pentagonal, hexagonal, heptagonal, or the like. The essential point is to form the lower portion of the ram in a shape having an automatic alignment function.

Further, in this embodiment, the ram 14 is pressed by the left and right pressing plates 23, 23 but in the present invention, the ram 14 may be pressed by, for example, one pressing plate 23' as shown by the two-dot chain line in FIG. 6(a).

In this embodiment, the cross slide 13 is structured such that the flat part 13b and the cylindrical ram supporting part 13c having the ram guide hole 13a are integrally formed by molding. Therefore, cost can be reduced and dimension accuracy can be enhanced, compared with a case where the cross slide is dividedly formed.

Further, the slide plates constituting the supporting surfaces 22a and the pressing plates 23 constituting the pressing surfaces 23a are fixedly disposed in the ram guide hole 13a of the cross slide 13, which can facilitate position adjustment or the like when the ram 14 is mounted.

In this embodiment, each of the slide plates 22 is composed of the parallel plates whose thickness in the Y-axis direction is fixed, and each of the pressing plates 23 is composed of the base plate 19 and the liner plate 20 each having the inclination. Therefore, it is possible to easily assemble the ram 14 with high accuracy by adjusting the pressing force by the base plates 19 and the liner plate 20, with the slide plates 22 serving as the reference planes.

In this embodiment, the slide plates 22 and the pressing plates 23 are disposed on each of the axial-direction both end portions of the cross slide 13 and the gravity center of the ram is constantly positioned between the both end portions. Therefore, it is possible to prevent the gravity center from overhanging from the cross slide 13 in accordance with the movement of the ram 14 in the Y-axis direction, which can prevent the ram 14 from being deformed by the machining reaction force, resulting in improved machining accuracy.

In this embodiment, the tool spindle 6a of the third spindle 6 is directed perpendicularly to the axis of the ram 14 and is rotary indexable around the Y axis, which enables complicated machining by so-called B-axis driving.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A machine tool comprising
a spindle supporting mechanism by which a spindle disposed on a bed is supported to be movable in X-axis, Y-axis, and Z-axis directions,
wherein said spindle supporting mechanism comprises:
a cross slide supported via a saddle by a column disposed on the bed to be movable in the Z-axis (left/right) and X-axis (up/down) directions; and
a cylindrical ram supported by said cross slide to be movable in the Y-axis direction and supporting the spindle, and
wherein said ram is slidably inserted in a ram guide hole formed in said cross slide and has a supported surface formed on a lower side of an outer circumferential surface thereof, said cross slide has a supporting surface which is formed on a lower side of an inner circumferential surface of the ram guide hole and by which the supported surface is supported to be slidable in the Y axis direction, and the supporting surface and the supported surface automatically align a Z-axis direction position of said ram,
wherein said ram has a pressed surface formed on an upper side of the outer circumferential surface, and the ram guide hole of said cross slide has a pressing surface formed on an upper side of the inner circumferential surface and slidably pressing the pressed surface, and
wherein the outer circumferential surface of said ram is in a polygonal shape, in which two lower sides constitute the supported surface in a V-shape and two upper sides among the other sides constitute the pressed surface in a V-shape, and the supporting surface and the pressing surface in a V-shape are formed on the lower side and the upper side of the inner circumferential surface of the ram guide hole of said cross slide respectively.

2. The machine tool according to claim 1,
wherein said cross slide is composed of a flat part supported by said saddle and a cylindrical ram supporting part having the ram guide hole, the flat part and the ram supporting part being integrally formed, and a slide plate constituting the supporting surface and a pressing plate constituting the pressing surface are provided on the inner circumferential surface of said ram guide hole.

3. A machine tool comprising
a spindle supporting mechanism by which a spindle disposed on a bed is supported to be movable in X-axis, Y-axis, and Z-axis directions,
wherein said spindle supporting mechanism comprises:
a cross slide supported via a saddle by a column disposed on the bed to be movable, in the Z-axis (left/right) and X-axis (up/down) directions; and
a cylindrical ram supported by said cross slide to be movable in the Y-axis direction and supporting the spindle, and
wherein said ram is slidably inserted in a ram guide hole formed in said cross slide and has a supported surface formed on a lower side of an outer circumferential surface thereof, said cross slide has a supporting surface which is formed on a lower side of an inner circumferential surface of the ram guide hole and by which the supported surface is supported to be slidable in the Y axis direction, and the supporting surface and the supported surface automatically align a Z-axis direction position of said ram, wherein said ram has a pressed surface formed on an upper side of the outer circumferential surface, and the ram guide hole of said cross slide has a pressing surface formed on an upper side of the inner circumferential surface and slidably pressing the pressed surface, and wherein said cross slide is composed of a flat part supported by said saddle and a cylindrical ram supporting part having the ram guide hole, the flat part and the ram supporting part being integrally formed, and a slide plate constituting the supporting surface and a pressing plate constituting the pressing surface are provided on the inner circumferential surface of said ram guide hole.

4. The machine tool according to claim 3, wherein the slide plate is composed of parallel plates whose thickness is fixed in the Y-axis direction, and the pressing plate is composed of a base plate and a liner plate each having an inclination in the Y-axis direction.

5. The machine tool according to claim 4, wherein the slide plate and the pressing plate are disposed in each of axial-direction both end portions of the ram supporting part, and a gravity center of said ram is constantly positioned between the both end portions of the ram supporting part in a whole stroke of said ram.

6. The machine tool according to claim 3, wherein the slide plate is integrally formed on the inner circumferential surface of the ram guide hole of said ram supporting part.

7. The machine tool according to claim 6, wherein the slide plate and the pressing plate are disposed in each of axialdirection both end portions of the ram supporting part, and a gravity center of said ram is constantly positioned between the both end portions of the ram supporting part in a whole stroke of said ram.

8. The machine tool according to claim 3, wherein the slide plate and the pressing plate are disposed in each of axial-direction both end portions of the ram supporting part, and a gravity center of said ram is constantly positioned between the both end portions of the ram supporting part in a whole stroke of said ram.

* * * * *